United States Patent [19]
Natali et al.

[11] Patent Number: 5,910,777
[45] Date of Patent: Jun. 8, 1999

[54] POWER EFFICIENT PAGING FOR MOBILE USERS IN A TERRESTRIAL AND SATELLITE COMMUNICATIONS SYSTEM

[75] Inventors: Francis F. Natali, Port Townsend, Wash.; John E. Ohlson, Mountain View, Calif.

[73] Assignee: Stanford Telecommunications, Inc., Sunnyvale, Calif.

[21] Appl. No.: 08/787,593

[22] Filed: Jan. 22, 1997

[51] Int. Cl.$^6$ ......................................................... G08B 5/22
[52] U.S. Cl. ...................... 340/825.44; 455/436; 455/437
[58] Field of Search .................... 375/205, 200, 375/335, 206; 370/18, 209, 331, 332, 329, 350; 380/34; 455/436, 437, 435, 450, 502; 340/825.44

[56] References Cited

U.S. PATENT DOCUMENTS

| | | | |
|---|---|---|---|
| 4,901,307 | 2/1990 | Gilhousen et al. | 370/18 |
| 5,497,395 | 3/1996 | Jou | 375/205 |

OTHER PUBLICATIONS

M. J. E. Golay "An Approach to Multiple Satellite Communications Through The Use of Network Synchronized Orthogonal Signals", Apr. 1965, pp. 107–114, Defense Documentation Center, Document No. AD465789.

Shlomo Rakib "Inventor of S–CDMA Rises Above Noise", Aug. 1996, p. 18, CED: Communications Engineering & Design.

F.J. MacWilliams, et al. "The Theory of Error–Correcting Codes", Ch. 2 §3, pp. 45–49 (no date).

*Primary Examiner*—Michael Horabik
*Assistant Examiner*—Jean B. Jeanglaude
*Attorney, Agent, or Firm*—Townsend and Townsend and Crew LLP; Henry K. Woodward

[57] ABSTRACT

A method of paging assigns a unique digital address to mobile stations with each unique digital address being mapped into an orthogonal signal set which is then transmitted to all mobile stations. Each mobile station then correlates a received orthogonal signal function against an orthogonal function corresponding to its address. More particularly, each orthogonal signal set comprises a binary orthogonal signal set such as a set of Rademacher-Walsh functions. Other well known orthogonal function sets can be employed. For example, an mbit address can be partitioned into g binary sequences and each sequence is then uniquely mapped into one of $2^{m/g}$ orthogonal functions.

6 Claims, 2 Drawing Sheets

POWER EFFICIENT PAGING FOR MOBILE USERS IN A TERRESTRIAL AND SATELLITE COMMUNICATIONS SYSTEM

BACKGROUND OF THE INVENTION

This invention relates generally to mobile communications systems such as cellular telephone and satellite systems, and more particularly the invention relates to the paging of mobile users in such systems.

Mobile satellite systems and cellular systems are generally star configured, with all communications going through a ground station. The outbound ground to mobile link is referred to as the Forward Link (FL). Satellite systems usually employ multibeam antennas providing coverage which has some similarity to a cellular system. The FL in each beam is received by all active user terminals (UT) within the beam. The FL generally consists of common control channels which are monitored by all users, user associated control channels, traffic channels, and synchronization overhead.

Terrestrial cellular telephone systems such as AMPS, GSM, and IS-95 all include forward link paging channels where "paging" is defined as "the act of seeking a mobile station when an incoming call from the land station has been placed to it". See Lee W. C. Y., *Mobile Cellular Telecommunication Systems,* McGraw-Hill Book Company, 1989. In each case, the Paging Channel is similar in structure to a control channel and carries a message containing the address of the user terminal (UT) that is being called. In the case of IS-95, the paging channel can operate at rates of up to 9600 bps.

Satellite systems differ from terrestrial system in a number of important ways—one of the most important is that forward link power is a scarce and precious resource. Link margins are necessarily limited and it is desirable to keep the overhead due to paging to a minimum.

There are a number of global and regional mobile satellite systems designed to work with handheld UT's that are presently in the proposal or development stage. These include Odyssey, Globalstar, ICO and Thuraya, among others.

Typically, a handheld UT which is available to receive incoming calls would monitor a common control channel used for paging and listen for its user address. The paging may be organized in "paging groups" so that the UT only listens to pages at certain times (e.g. once every 2 seconds) rather than continuously. This allows the terminal to shut down part of the time and save battery power. If the UT detects a page, it responds and call set-up proceeds. The paging operation is usually done at the normal control channel data rate and requires an Eb/No of from 3 to 9 dB depending on the amount of coding, the type of modulation employed, and the desired performance. The total received energy in the page is:

$$E_T = mP_sT_b;$$

where:
m=number of bits in the paging message;
$P_s$=received signal power; and
$T_b$=data bit period.

Some satellite systems are considering a "deep paging" function. The purpose of deep paging would be to alert a shadowed user, who could not detect the ordinary traffic or control channels due to signal attenuation, that there was an incoming call. The user could then move to a more favorable location, such as a window if he were inside a building. Deep paging would typically take place at signal levels of 25 dB or more below nominal. The deep paging message would typically be sent at a very low data rate to accommodate the low signal level. This makes coherent detection problematic due to UT phase noise, as well as channel coherence times. Noncoherent detection is much more attractive but is not as power efficient.

The present invention is directed to a paging system with increased power efficiency and having the robustness of noncoherent detection.

SUMMARY OF THE INVENTION

Briefly, a method of paging in accordance with the invention assigns a unique digital address to mobile stations with each unique digital address being mapped into a unique member of an orthogonal signal set. The appropriate orthogonal function corresponding to a particular address is then transmitted to all mobile stations. Each mobile station then correlates the received orthogonal signal function against an orthogonal function corresponding to its address.

More particularly, in accordance with a preferred embodiment, each orthogonal signal set comprises a binary orthogonal signal set such as the Rademacher-Walsh functions. Other well-known orthogonal function sets can be employed. For example, an m bit address can be partitioned into g binary sequences and each sequence is then uniquely mapped into one of $2^{m/g}$ orthogonal functions.

Each mobile station implements a single correlator matched to its unique address, and paging then becomes a simple signal detection problem with a single threshold on the correlator output which can be set based on a desired false alarm rate.

The invention and objects and features thereof will be more readily apparent from the following detailed description and appended claims when taken with the drawings.

DETAILED DESCRIPTION OF THE PREFERRED EMBODIMENT

Figure 1:
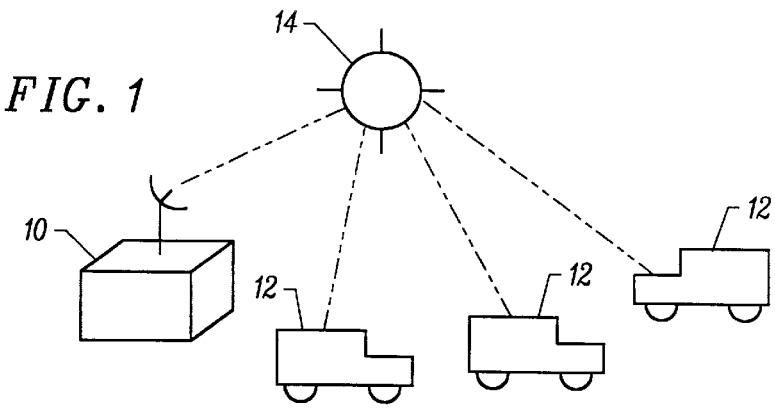
FIG. 1 is a schematic representation of a satellite communications system in which the invention can be employed.

FIG. 1 is a representation of a mobile communication system in which the present invention is applicable. The system can be a cellular telephone system or a mobile satellite system which are generally star configured with all communications going through a ground station 10. As noted above, cellular systems usually employ multibeam antennas which provide coverage in a forward link to all active user terminals (UT) 12 within the beam. In a satellite system, the forward link from ground station 10 can include one or more satellites 14.

Figure 2:
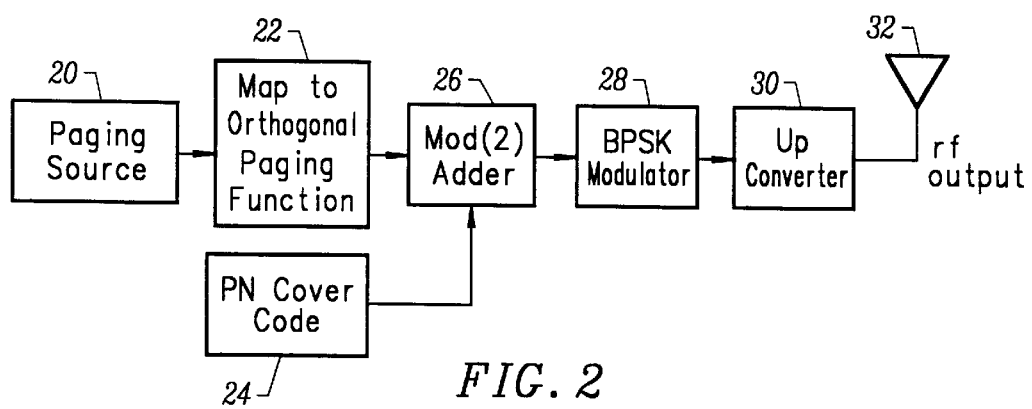
FIG. 2 is a functional block diagram of a paging transmitter in accordance with one embodiment of the invention.

In accordance with the present invention, paging from the ground station 10 to the mobile user terminals 12 employs the mapping of each unique terminal address to a unique orthogonal paging function, as illustrated in FIG. 2 for the paging source 20 and the mapping function 22. A pseudo-noise generator 24 generates a PN cover code which is applied to a modulo two adder along with the orthogonal paging code which then drives a binary phase shift key modulator 28. The modulated signal is then up converted at 30 for transmission from antenna 32.

Figure 3:
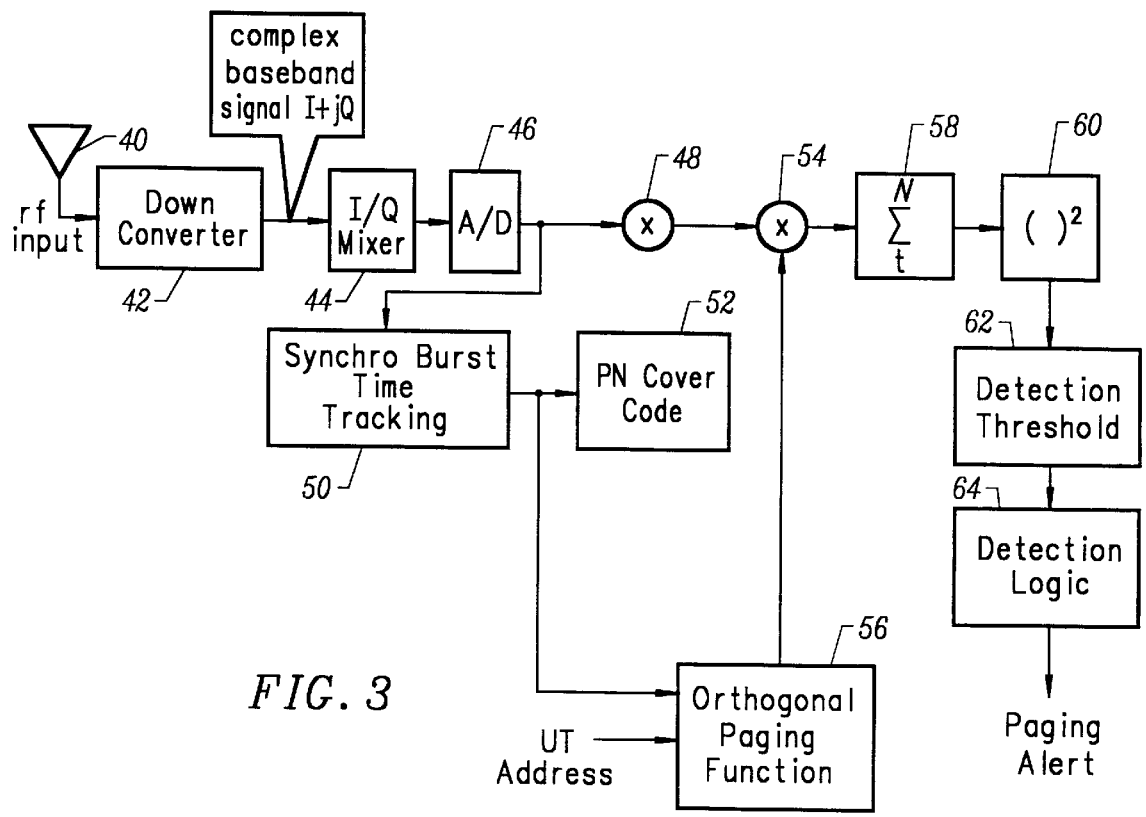
FIG. 3 is a functional block diagram of a paging detector in a mobile station in accordance with one embodiment of the invention.

As shown in FIG. 3, each mobile station has a receive antenna 40 for receiving the transmitted signal. A downconverter 42 and I/Q mixer 44 recover the complex baseband signal (I+jQ) which is then applied to an analog to digital converter 46. The resulting digital signal is then applied to a mixer 48 and a synchro-burst time tracking unit 50 which provides timing to a PN cover code generator 52. The output of the PN cover code is applied to mixer 48 with the output applied to a second mixer 54 along with a signal from the orthogonal paging function unit 56. The orthogonal paging function of unit 56 is selected based on the input UT address. A summer 58 and detector 60 provide an output to a detection threshold unit 62. The detection threshold unit 62 then drives detection logic 64 which provides a paging alert when an address is detected.

Figure 4:
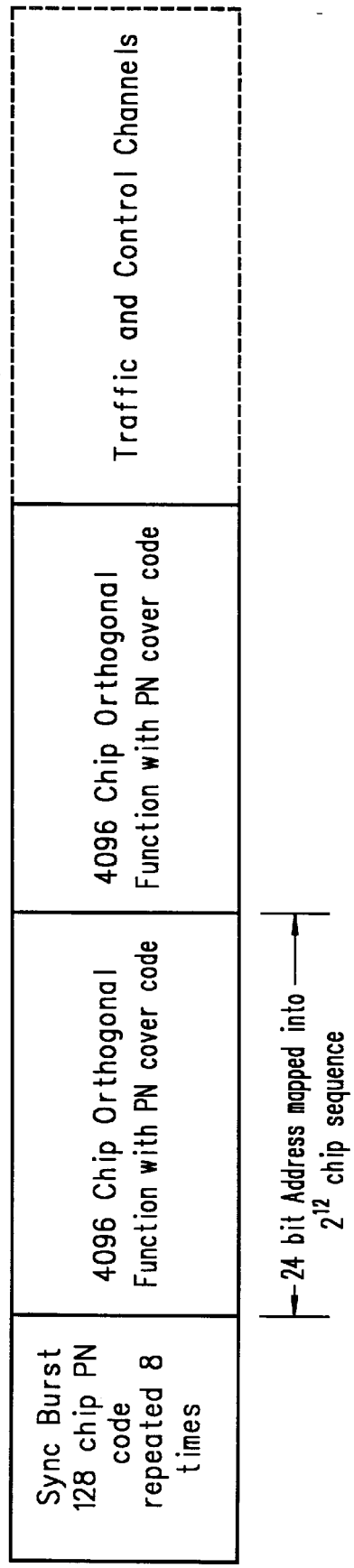
FIG. 4 illustrates a forward link waveform with orthogonal function paging in accordance with the invention.

FIG. 4 represents a typical forward link waveform with orthogonal function paging as used in the system of FIGS. 2 and 3.

Convenient constructions of orthogonal binary functions of length n (where n is a multiple of 4) are generally based on constructing an n×n Hadamard matrix, the rows of which are the desired orthogonal functions. These matrices are conjectured to exist for any length that is a multiple of 4, although this has not been proved. The Rademacher-Walsh (or the Hadamard-Walsh) functions are one well known type of orthogonal function with length $2^m$. Sylvester matrices are Hadamard matrices of order $2^m$ and are easily constructed for any m. There are other constructions, which are not limited to orders which are a power of 2.

One convenient construction is to form a $(2^m-1) \times (2^m-1)$ matrix whose rows are all the cyclic shifts of a maximal length sequence of length $(2^m-1)$. This matrix is then augmented with a first row of all 1's and a first column of all 1's, forming a $2^m \times 2^m$ matrix with orthogonal rows.

It may be convenient to choose orthogonal functions with lengths that are not of the form $2^m$. For example, if the address group is sized at 224 addresses, a set of orthogonal functions of length 224 may be employed.

If the FL carries an orthogonal function which is unique to a particular user, the UT can employ a correlater with the orthogonal waveform corresponding to its address. The correlater will respond when the proper function is received. In this way, the paging operation becomes a signal detection problem rather than a data detection problem. This can offer considerable advantage in detection efficiency, even in a noncoherent configuration.

In the discussion above, $2^m$ chips are transmitted to convey an m bit address, i.e. a bandwidth expansion is required. If the air interface employs direct sequence (DS) spread spectrum signaling, the chips of the orthogonal address function would be transmitted at the spreading function chip rate (or less). In this case, there is no additional bandwidth expansion over what is already being used. Further, if desired, the orthogonal function can be covered with a PN sequence which is common to all users.

It should be noted that the scheme described here is not the same as orthogonal coding such as used on the reverse link of IS-95. In the case of orthogonal coding of data, the user implements a decoder which correlates against all possible sequences and compares the correlater outputs to determine which data was sent. The complexity of such a decoder necessarily limits the length of the orthogonal sequences employed. Further, since multiple outputs are being compared, the problem is one of correctly selecting the correlater which matches the transmitted sequence. In the paging technique described here, the UT implements only a single correlater matched to its unique sequence. The problem then becomes a simple signal detection problem with a single threshold on the correlater output which is set based on the desired false alarm rate. The simplicity of this implementation is a decided advantage in a handheld UT.

An implied requirement of the above scheme is that the UT be synchronized to the FL signal. This is, of course, a requirement for the paging techniques that rely on data transmission as well, so there is no additional requirement in the orthogonal signaling scheme. It is however, advantageous to have a means to maintain synchronization at low signal levels for "deep paging". One way to do this is to transmit a PN sequence of short duration as a synchronization burst at periodic intervals. No other signals are active during this synchronization burst (note that this is very different from the Pilot Channel of IS-95 which is transmitted continuously in conjunction with the other signals and uses one of the Hadamard-Walsh access codes for isolation).

The energy required to send a page is:

$$E'_p = NP_s T_C;$$

where:
N=length of the orthogonal function; and
TC=chip period.

The ratio of the energies required for orthogonal paging as compared to conventional paging is:

$$\Gamma = \frac{E'_p}{E_p} = \frac{N \frac{P'_s}{N_o} T_c}{m \frac{P_s}{N_o} T_b} = \frac{(SNR_1)_{Req'd}}{m \left( \frac{E_b}{N_o} \right)_{Req'd}} \quad (1)$$

If $\Gamma$ is evaluated for a typical situation where m=24, $(SNR_1)_{Req'd}$=13.6 dB for $P_D$=0.99, $P_{FA}$=3×10$^{-5}$, and $$\left( \frac{E_b}{N_o} \right)_{Req'd} = 7.6 \, dB$$

for $P_e$=3×10$^{-4}$, then $\Gamma$=−7.9 dB.
That is, for this example, orthogonal paging requires about 8 dB less power than conventional paging.

As a variation on the above technique, the UT address can be partitioned into two or more equal groups of bits and a smaller set of orthogonal functions employed. For example, a 24 bit address could be partitioned into two 12 bit groups, and a $2^{12} \times 2^{12}$ orthogonal signal set employed. This reduces transmission time by a factor of 5×10$^{-4}$ for the same chipping rate! Now, however, every address will have 23 neighbors that are only 3 dB down in correlation (all other addresses remain orthogonal). These near neighbors dominate the false paging performance at high SNRI, but this is still a valuable technique for trading power for transmission length, especially at low SNR's. A typical FL waveform with orthogonal paging is shown in FIG. 4.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In a mobile communication system in which a ground station communicates data with mobile stations at a message transmission energy level, a power efficient method of paging a mobile station from the ground station comprising the steps of:
   a) assigning a unique digital address to each mobile station;
   b) mapping each unique digital address into a unique member of an orthogonal signal set;
   c) transmitting the unique member of the orthogonal signal corresponding to the mobile being paged to some or all mobile stations at a paging energy level lower than the message transmission energy level, and
   d) each mobile station correlating a received orthogonal signal set against the orthogonal function corresponding to its address using a correlator for identifying the orthogonal function, whereby a page is recognized by signal detection without the need for message decoding.

2. The method as defined by claim 1, wherein said orthogonal signal set comprises a binary orthogonal signal set.

3. The method as defined by claim 2, wherein said binary orthogonal signal set comprises a set of Radamacher-Walsh functions.

4. The method as defined by claim 3, wherein an mbit address is partitioned into g binary sequences and each sequence is uniquely mapped into one of $2^{m/g}$ orthogonal functions.

5. The method as defined by claim 4, wherein the signal from a ground station is relayed through at least one satellite.

6. In a mobile communication system in which a ground station communicates with mobile stations at a message transmission energy level, a mobile station detector for use in identifying a page from the ground station at an energy level lower than the message transmission energy level, said detector including an orthogonal function correlator which detects a transmitted signal having an orthogonal function unique to the mobile station without the need for message decoding.

* * * * *